(12) United States Patent
Yi

(10) Patent No.: US 11,336,607 B2
(45) Date of Patent: May 17, 2022

(54) MANAGING MULTIPLE FORMS OF MESSAGES IN A MESSAGING APPLICATION

(71) Applicant: NHN, Seongnam-si (KR)

(72) Inventor: Eunae Yi, Seongnam-si (KR)

(73) Assignee: NHN, Seongnam-si (KR)

( * ) Notice: Subject to any disclaimer, the term of this patent is extended or adjusted under 35 U.S.C. 154(b) by 0 days.

(21) Appl. No.: 16/528,512

(22) Filed: Jul. 31, 2019

(65) Prior Publication Data

US 2020/0045006 A1    Feb. 6, 2020

(30) Foreign Application Priority Data

Jul. 31, 2018  (KR) .................. 10-2018-0089208

(51) Int. Cl.
*H04L 51/226*  (2022.01)
*H04L 51/00*  (2022.01)
*H04L 51/42*  (2022.01)
*H04L 51/56*  (2022.01)

(52) U.S. Cl.
CPC .............. *H04L 51/26* (2013.01); *H04L 51/12* (2013.01); *H04L 51/16* (2013.01); *H04L 51/22* (2013.01); *H04L 51/36* (2013.01)

(58) Field of Classification Search
None
See application file for complete search history.

(56) References Cited

U.S. PATENT DOCUMENTS

| | | | |
|---|---|---|---|
| 2008/0153459 A1* | 6/2008 | Kansal ................. | H04M 1/7243 455/412.1 |
| 2011/0087972 A1* | 4/2011 | Swink ................ | H04M 1/72436 715/752 |
| 2013/0097173 A1* | 4/2013 | Stovicek ............. | G06F 3/04883 707/741 |
| 2015/0244657 A1* | 8/2015 | Ghafourifar .......... | G06F 16/951 709/206 |
| 2015/0350143 A1* | 12/2015 | Yang ................... | G06F 16/9535 345/173 |
| 2016/0021036 A1* | 1/2016 | Choi ....................... | H04L 51/04 709/206 |
| 2016/0164815 A1* | 6/2016 | Cho ........................ | H04L 51/04 709/206 |
| 2016/0188584 A1* | 6/2016 | Glover .................... | G06F 16/93 707/608 |

FOREIGN PATENT DOCUMENTS

| | | |
|---|---|---|
| KR | 10-2014-0127309 A | 11/2014 |
| KR | 10-2016-0035198 A | 3/2016 |

OTHER PUBLICATIONS

Office Action of corresponding Korean Patent Application No. 10-2018-0089208—5 pages (dated Sep. 17, 2019).

\* cited by examiner

*Primary Examiner* — Younes Naji
(74) *Attorney, Agent, or Firm* — K&L Gates LLP

(57) ABSTRACT

Provided is a method of providing a function of managing a VIP message. The method includes transmitting and receiving messages from a plurality of clients; setting at least one of the plurality of clients to a specific person; extracting messages transmitted by a specific person among the transmitted and received messages as VIP messages; combining the extracted VIP messages; and providing the combined VIP messages through a combined chat room.

7 Claims, 10 Drawing Sheets

MANAGING MULTIPLE FORMS OF MESSAGES IN A MESSAGING APPLICATION

BACKGROUND

Technical Field

The present disclosure relates to a method and terminal for providing a function of managing a message of a VIP. More specifically, the present disclosure relates to a method and terminal for providing a function of managing a specific VIP in a process of transmitting and receiving chatting, e-mails, and/or messages for sharing a project.

Related Art

Nowadays, with the spread of super high speed wireless network technology and various types of smart terminals, an instant message service using the same is widely used. The instant message service is a service in which two or more terminal users open a chat room and exchange instant messages in real time in the opened chat room based on a network such as the Internet.

However, conventionally, in the instant message service, when a user is in various chat rooms with a specific person, in order to check messages of the specific person, there is inconvenience that the user should manually enter a corresponding chat room and check the messages.

Further, in some SNS services, a "@ mention" service has been provided that points a specific user and that transmits a message to the pointed user and that is a collection view method of users, having received the transmitted message, but when another party who uses the @ mention service does not mention the user, there is inconvenience that message collection view is not available.

Further, an amount of chat messages in which common users transmit and receive to and from another party per day has increased exponentially. However, as an amount of chat messages increases, it may be difficult to systematically manage each of chat messages or to search again and use the already transmitted and received chat messages.

Further, in recent years, companies grow that use separately a commercial messenger instead of a personal messenger, and a market size of the commercial messenger increases. However, although a commercial messenger is used separately, an average monthly amount of messages automatically or manually transmitting and receiving to and from persons for a business overpasses 2 billion cases and the need of a systematic message management services increases for reasons such as inconvenience in separating and managing only messages of another party (e.g., VIP customer) in which users want.

SUMMARY

The present disclosure provides a function of managing only messages of a specific person in a process of transmitting and receiving messages.

Specifically, an embodiment of the present invention provides a function of extracting messages of a specific person designated by a user and enabling collection view of messages in one combined chat room.

Further, an embodiment of the present invention provides a function of combining and managing messages of various message transmission and reception functions in a comprehensive sense as well as messages through a chatting function.

Further, an embodiment of the present invention provides a function of effectively managing and using one combined message of a specific person.

However, technical problems to be performed by embodiments of the present invention are not limited to the above-described technical problems and there may be other technical problems.

In an aspect, a method of providing a function of managing a VIP message to be performed by a processor of a terminal includes transmitting and receiving messages to and from a plurality of clients; setting at least one of the plurality of clients to a specific person; extracting messages transmitted by a specific person among the transmitted and received messages as VIP messages; combining the extracted VIP messages; and providing the combined VIP messages through a combined chat room, wherein the VIP messages includes a heterogeneous format message including the specific person's chat message within a chat room, the specific person's e-mail, or the specific person's project comment, and wherein the combining of the extracted VIP message includes combining the chat message and the heterogeneous format message.

Preferably, the setting of at least one includes providing a VIP setting interface, and wherein the VIP setting interface includes at least one interface of an interface that lists the plurality of clients and that sets one client selected by the user to a VIP among the listed clients; an interface that lists the plurality of clients and that sets, when at least two of the listed clients are selected, the selected clients to a VIP group; and a VIP filter setting interface that distinguishes clients with at least one reference.

Preferably, the providing of the combined VIP messages includes providing, when one specific person is set through the interface that sets one client to a VIP, a message in which the specific person transmits to the user through one combined chat room; providing, when a plurality of specific persons are set through the interface that sets to a VIP group, messages in which the plurality of specific persons transmit to the user through one combined chat room; and providing, when at least one specific person applied to the filter is set through the VIP filter setting interface, a message in which the preset specific person transmits to the user through the combined chat room.

Preferably, the transmitting and receiving of messages to and from a plurality of clients includes at least one of transmitting and receiving messages through at least one chat room including an instant message transmitted by the client; receiving a message transmitted by the client as the heterogeneous format message; and receiving a comment written by the client at a specific step of the project while performing the project as the heterogeneous format message.

Preferably, the extracting of a message transmitted by a specific person further includes extracting messages transmitted by the specific person as VIP messages in at least two chat rooms; and extracting information of a chat room in which the message is extracted.

Preferably, the combining of the extracted VIP message includes listing the VIP messages extracted from the plurality of chat rooms in chronological order, and wherein the providing of the combined VIP message through a combined chat room includes displaying the VIP messages listed in chronological order.

Preferably, the method further include generating a final VIP message by adding the chat room information to the VIP message, wherein the final VIP messages include at least one information of a content of the message, a message reception time, a message attribute, a message position, and link information to the message position.

Preferably, the providing of the combined VIP message through a combined chat room includes listing and displaying the final VIP messages in chronological order.

Preferably, the generating of a final VIP message includes adding content information before and after chatting displayed before and after the VIP message of the specific person in the chat room.

Preferably, the method further includes converting an attribute of the heterogeneous format message to a chat room message format to generate a final VIP message.

Preferably, the combining of the extracted VIP message includes combining VIP messages extracted from the plurality of chat rooms and the final VIP message having a converted attribute in chronological order.

Preferably, the providing of the combined VIP message through a combined chat room includes displaying together the VIP messages and the final VIP messages listed in chronological order in the combined chat room.

Preferably, the final VIP message having a converted attribute includes at least one information of a content of the message, a message reception time, a message attribute, a message position, and link information to the message position.

In another aspect, a terminal for providing a function of managing a message of a VIP includes a communication processor for transmitting and receiving messages to and from a plurality of clients; a display for displaying the transmitted and received messages; and a processor for providing a function of transmitting and receiving messages to and from the plurality of clients and for providing a VIP management function for setting and managing at least some of the plurality of client to VIPs, wherein the processor sets at least one of the plurality of clients to a specific person, extracts messages transmitted by a specific person among the transmitted and received messages to VIP messages, combines the extracted VIP messages, and controls the display to display the combined VIP message through a combined chat room.

Preferably, the function of transmitting and receiving messages to and from the plurality of clients includes at least one of a function of transmitting and receiving messages through at least one room including an instant message transmitted by the client, a function of receiving a mail transmitted by the client as a heterologous format message, and a function of receiving a comment written by the client at a specific step of a project as a heterogeneous format message while performing the project.

Preferably, the processor controls to extract messages transmitted by the specific person in at least two chat rooms as VIP messages and to further extract information of a chat room in which the messages are extracted to extract messages transmitted by the specific person as VIP messages.

Preferably, the processor controls to list VIP messages extracted from the plurality of chat rooms in chronological order and to display the VIP messages listed in chronological order.

Preferably, the processor controls to add the chat room information to the VIP message to generate a final VIP message, and wherein the final VIP message includes at least one information of a content of a message, a message reception time, a message attribute, a message position, and link information to the message position.

Preferably, the processor controls to list and display the final VIP messages in chronological order.

Preferably, the processor controls to add content information before and after chatting displayed before and after the VIP message of the specific person in the chat room to generate the final VIP message.

DETAILED DESCRIPTION

Figure 1:
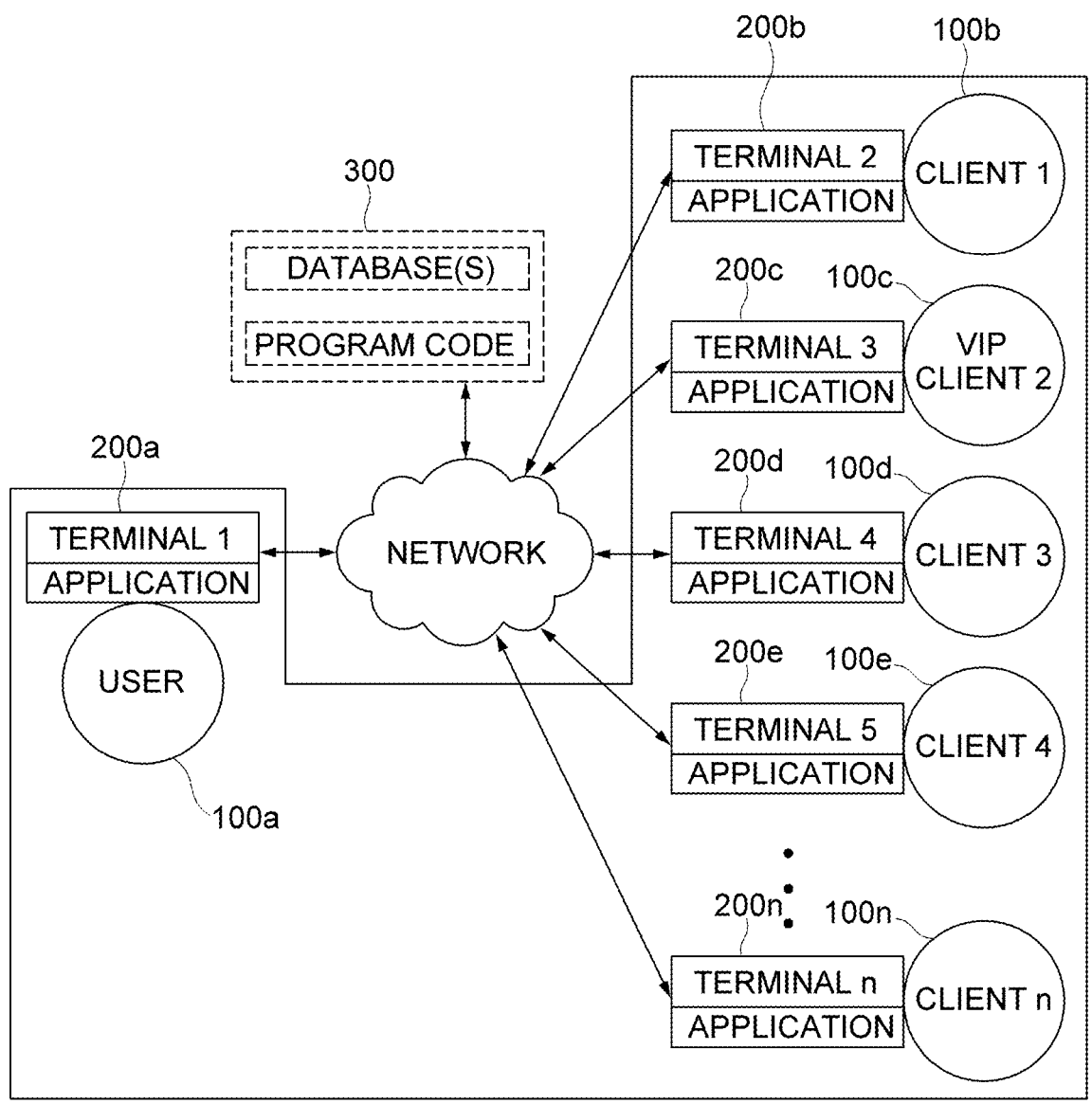
FIG. 1 is a block diagram of a terminal, a server, and a method for managing by extracting and combining related messages between a specific person and a user according to an embodiment of the present invention.

The present invention may be variously changed and have several embodiments, and specific embodiments are illustrated in the drawings and are described in detail in the detailed description. The efforts and characteristics of the present invention and methods of achieving them will become more readily apparent from the embodiments given hereinafter together with the drawings. However, the present invention is not limited to the following embodiments, but may be embodied in various forms. In the following embodiments, a term such as a first and a second is used for distinguishing one component from other components instead of a limiting meaning. Further, unless the context otherwise clearly indicates, words used in the singular include the plural, the plural includes the singular. Further, terms such as "comprise" or "have" mean presence of characteristics or components described in the specification but do not previously exclude possibility of addition of at least one other characteristic or component. Further, in the drawings, for convenience of description, a size of components may be exaggerated or reduced. Further, in the drawings, because a size and thickness of each component are randomly represented for better understanding and ease of description, the present invention is not limited thereto.

Hereinafter, embodiments of the present invention will be described in detail with reference to the accompanying drawings, and when describing embodiments with reference to the drawings, identical components or corresponding components are denoted by the same reference numerals and therefore a detailed description thereof is omitted.

Today people communicate with others using various electronic communication mechanisms such as email, texting, instant messaging, social media, etc. In each communication mechanism, people may use one or more channels or service providers. For example, a person may have multiple email accounts using different channels including Gmail™, Outlook™, Yahoo!™, etc. In each of the other communication mechanisms such as texting, instant messaging, social media messaging, people may use one or more channels or service providers as well.

Between two people, there may be a preferred form of communication mechanism and channel, e.g., instant messaging offered by Facebook™. However, it is common that for various reasons multiple electronic communication mechanism and multiple channels are used even between two people. Different communication mechanisms and different communication channels may have different data formats and therefore may require different communication/ messaging client software or applications. There are email client applications that receive and send emails through multiple channels. In the context of instant messaging or texting communications, however, many service providers provide their own messaging or texting applications for sending, receiving and viewing messages. Also, there is not a single communication application that allows consolidated viewing of communications through different mechanisms such as e-mails, texts, instant messages.

According to implementations of the present invention, a single messaging client application is offered to display various forms of messages from a sender to a receiving user. In implementations, the single messaging client application provides an organized presentation of multiple messages that the receiving user receives from a sender and are in different formats due to different communication mechanisms and/or different communication channels. In some examples, the messaging client application may be a mobile application installed in a mobile computing device such as a smartphone, a tablet, and a laptop computer. In other examples, the messaging client application may be a desktop computer application.

Figure 10:
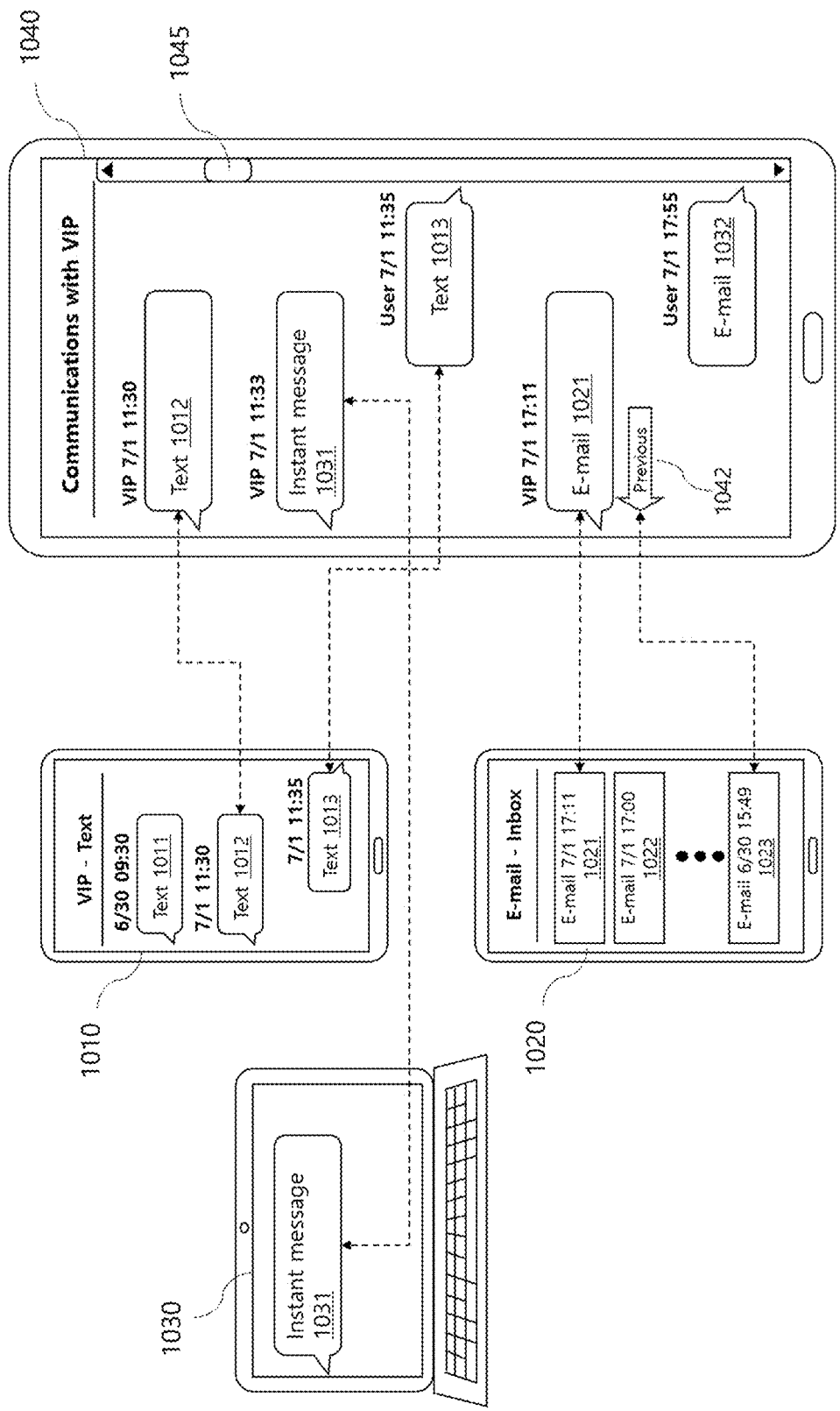
FIG. 10 shows screens displayed on user terminals according to an embodiment of the present invention.

FIG. 10 shows example screens of computing devices that a user uses to communicate. A first screen 1010 is a user interface of one of several texting (text messaging) applications installed on the user's smartphone. A second screen 1020 is a user interface of an e-mail client application on the smartphone. A third screen 1030 is a user interface of an instant messaging application on the user's laptop. A fourth screen 1040 is a user interface of a mobile application according to an implementation of the present invention.

Referring to the first screen 1010 of FIG. 10, this user interface is dedicated to texting communications with a particular person. For the sake of convenience, this particular person is referred to as VIP when the person is selected for an organized display in a communication client application like the fourth screen 1040. The user interface of the texting application presents a series of text messages 1011, 1012, 1013 between the user and VIP in a chronological order. The texting application allows the user to receive, send and display text messages. However, this texting application does not receive or send emails.

Referring to the second screen 1020 of FIG. 10, this user interface may be an inbox of the e-mail client application and is not dedicated to VIP. Accordingly, the user interface presents e-mails 1021, 1023 from VIP and e-mails 1022 from others. The e-mail client application allows the user to receive, send and display e-mails. However, the e-mail client application does not receive or send text messages or instant messages.

Referring to the second screen 1030 of FIG. 10, this user interface may be a chat room of the instant messaging application installed on the user's laptop. The interface presents instant message 1030 sent from VIP. The instant messaging application allows the user to receive, send and display instant messages. However, the e-mail client application does not receive or send e-mails or instant messages.

Implementations of the present invention provide an application that can manage messages of multiple communication mechanisms and/or channels on a single screen as if such messages of multiple communication mechanism and/or channels are received or sent via a single communication channel. For the sake of convenience, this application may be referred to as a consolidation application in this disclosure. The fourth screen 1040 of FIG. 10 is a user interface of such a consolidation application for a mobile device. The user interface of the consolidation application presents text messages 1012, 1013, an instant message 1031, e-mails 1021, 1032 that are received and sent via different communication mechanisms and/or channels. As illustrated, the user interface presents these messages in a chronological order regardless of their respective formats, communication mechanisms or channels such that an e-mail may be followed by a text message which then may be followed by another e-mail. In other implementations of the present invention, the consolidation application may display these messages in multiple sections, each of which is dedicated to a particular communication mechanism or channel as in the screen 1150 of FIG. 11.

As in the fourth screen 1040 of FIG. 10, chat balloons may be used to present the messages. A chat balloon may not be big enough to display the whole content of its corresponding message. For example, a chat balloon may be sized to display only a portion of the particular text message. See the chat balloon for text message 1013. When the user selects, for example by touch, the chat balloon of the text message 1013, the smartphone may switch to the first screen 1010 to display the text message 1013 in full in the particular text message's client application. Alternatively, in response to the user's selection of the chat balloon of the text message 1013, the consolidation application may expands the chat balloon to display the text message 1013 in full.

The fourth screen 1040 of the consolidation application displays chat balloons for messages that the user received from or sent to VIP in a time frame, for example, between 11:30 and 17:55 on July 1. The e-mail 1022 of the second screen 1020 is not presented on the fourth screen 1040 because the fourth screen 1040 of the consolidation application dedicated to the user's communications with a particular person, here VIP and further because the e-mail 1022 is from a person other than VIP. To identify, select, locate, or retrieve messages to present on the fourth screen 1040, the consolidation application uses one or more one or more criteria that the user has set or approved. The one or more criteria can be selected from a sender, a recipient, a time, a location, an urgency indicator, a contained text, a contained image of the message can be used. For example, the consolidation application may present messages that VIP sent to the user, and does not present messages that the user sent to VIP. For another example, the consolidation application may present a message when the title of the message contains a specific keyword. For another example, the consolidation application may present a message when the message includes an attachment that satisfies a filtering critter (e.g. size, file type) that the user has set. A criterion other than the described above can be used as well.

The fourth screen 1040 of the consolidation application also displays an arrow 1042 under the chat balloon of the e-mail 1021. The arrow 1042 may include a link to the e-mail 1023 that is not presented on the fourth screen 1040 such that when the user selects the arrow 1042, the switch to the second screen 1020 to present the e-mail 1023. In some implementations, when the user selects the arrow 1042, the scroll bar 1045 moves to scroll the fourth screen 1040 until the consolidation application displays a chat balloon of the e-mail 1023. The consolidation application displays the arrow 1042 together with the chat balloon of the e-mail 1021 based on a relation between the e-mail 1021 and the e-mail 1023. For example, the consolidation application displays the arrow 1042 when the e-mail 1023 immediately precedes the e-mail 1021 in the same e-mail thread. For another example, the consolidation application displays the arrow 1042 when the e-mail 1021 has a common attachment. For another example, the consolidation application displays the arrow 1042 when the e-mail 1021 and the e-mail 1023 have the same recipient(s).

Figure 11:
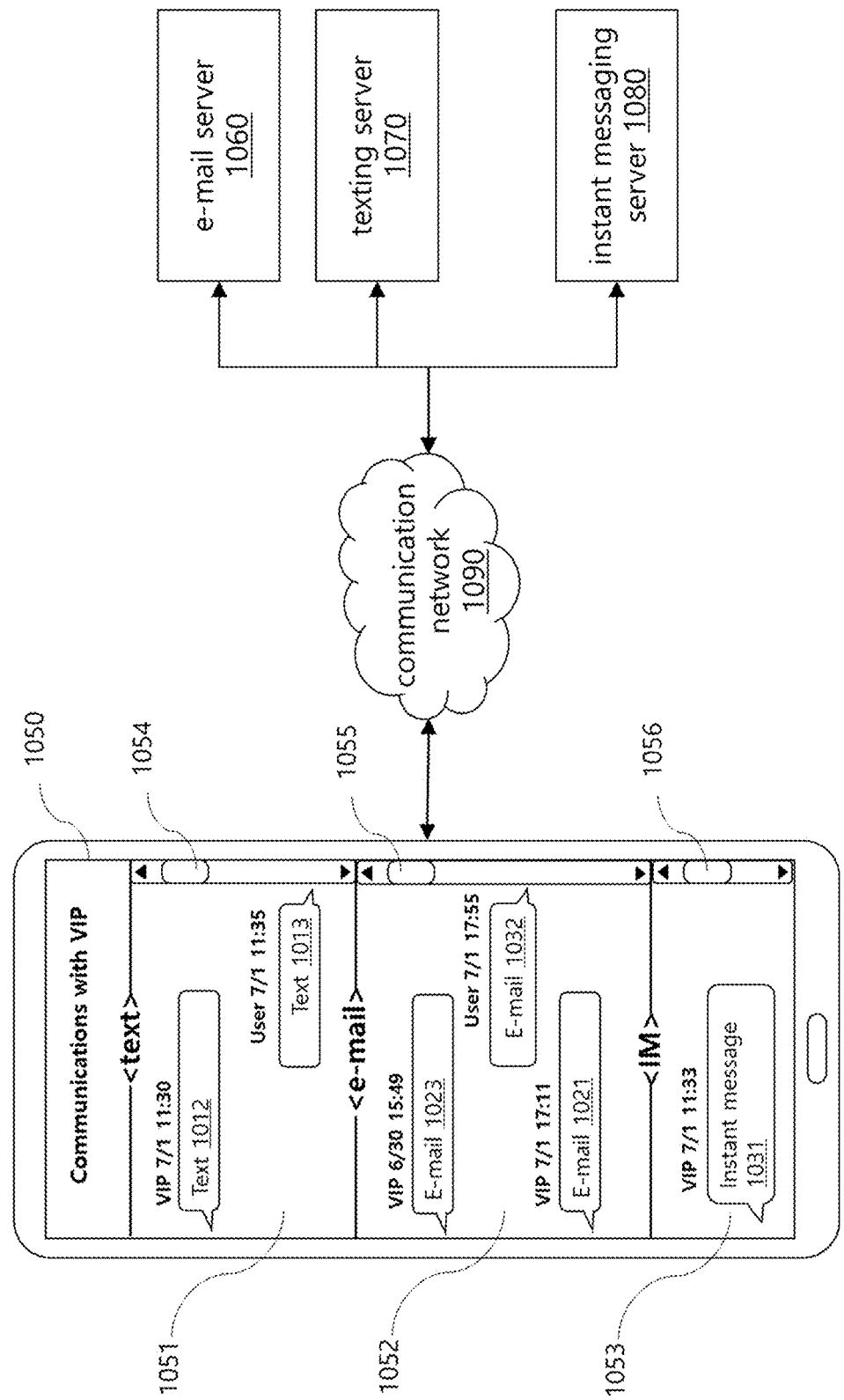
FIG. 11 shows a screen displayed on a smartphone according to an embodiment of the present invention.

Referring the fifth screen 1050 of FIG. 11, the consolidation application provides another user interface in which messages are presented in three sections 1051, 1052, 1053 that are separated from each other. Each section is designated to a particular format or communication mechanism/channel. The user may choose between the user interfaces of the fifth screen 1050 and the fourth screen 1040. In the fifth screen 1050, the text messages 1012, 1013 are displayed in the text message section 1051, the e-mails 1023, 1032, 1021 are displayed in the e-mail section 1052, and the instant message 1031 is displayed in the instant message section 1052. As illustrated, each section may have its own scroll interface 1054, 1055, 1056 for displaying messages that are not currently displayed. For example, scrolling up or down a scroll interface causes the consolidation application to display, in the corresponding section, messages that were sent/received before or after the currently displayed messages. The scroll interfaces 1054, 1055, 1056 may operate independently such that each section 1051, 1052, 1053 can be configured independently and accordingly display messages that are of different time ranges. The user may synchronize the sections 1051, 1052, 1053 or their scroll interfaces such that every section shows messages within the same time range. The user may scroll the sections 1051, 1052, 1053 together while the sections display messages different time ranges. For example, when the section 1052 displays e-mails of June 30 and the section 1053 displays instant messages of July 1 and when the user moves the scroll interface 1055 to see e-mails of July 1, the section 1053 may be also scrolled accordingly (by one day) to show instant messages of July 2.

Referring to FIG. 11, the smartphone is connected to one or more one or more servers 1060, 1070, 1080 of the multiple communication mechanisms (e-mail, texting, instant messaging) via one or more communication networks 1090. The consolidation application may communicate with the one or more servers for the multiple communication mechanisms/channels to obtain data relating to messages for displaying in its consolidation screens 1040, 1050. The consolidation application may communicate with one or more device of the user (e.g. the user's laptop) to obtain data relating to messages for displaying in its consolidation screens 1040, 1050.

The user may configure the consolidation application to retrieve the user's communications with VIP via multiple communication mechanisms and channels. For example, the user inputs to the consolidation application information for identifying VIP such as e-mail address(es), telephone number(s), name, username(s), etc. The consolidation application may communicate with one or more of an e-mail server of the user's e-mail account, a text messaging server, an instant messaging server with VIP's identification information for selectively retrieve emails, text messages and/or instant messages that are associated with VIP. Then, when there is an e-mail between the user and VIP, the e-mail server may notify the user's email client application of the receipt of the e-mail and further forward the e-mail or send a receipt notification to a consolidation server associated with the consolidation application. When there is a text or instant message between the user and VIP, the text messaging server or instant messaging server may forward the text messages or instant messages or send a receipt notification to the consolidation server. In response to the receipt notification, the consolidation server may communicate with the e-mail server, text messaging server or instant messaging server to retrieve the e-mail, text message or instant message. Upon receipt of the forwarded communication from the e-mail server, text messaging server or instant messaging server, the consolidation server may send a receipt notification or data of the forwarded communication to the user's consolidation application so that the consolidation application may display the forwarded communication whether it is an e-mail, a text message associated with the user's telephone number, an instant message associated with a social media network or any other form of communication.

The consolidation application may cause communication between the smartphone and the e-mail server 1060 to synchronize a local data store of the smartphone such that every new e-mail of the user's e-mail account is available locally on the smartphone. Then, the consolidation application may apply one or more filtering criteria to the e-mails stored in the local data store, and present a filtered set of e-mails on the screen 1040, 1050. In other implementations, consolidation application may retrieve e-mails selectively from the e-mail server 1060, using one or more criteria that identifies e-mails to present the screen 1040, 1050. For example, when the user configures the consolidation application to present only the messages communicated with VIP, the consolidation application provides e-mail address of VIP (or another identification of VIP) to the e-mail server 1060 and obtains data of e-mails received from or sent to the VIP e-mail address selectively from the e-mail server 1060 such that the consolidation application may not handle e-mails that were not sent to or received from VIP to configure the screen 1040, 1050. The consolidation application may communicate with a server 1060, 1070, 1080 to provide one or more criteria (e.g. time, location, title, sender, receiver of messages) that can be used to identify messages to present on the screen 1040, 1050, selectively obtain messages satisfying the one or more criteria, and then apply one or more filtering criteria to the selectively obtained messages to display the screen 1040, 1050.

FIG. 1 is a block diagram illustrating a terminal, a server, and a method for managing by extracting and combining related messages between a specific person and a user according to an embodiment of the present invention.

Referring to FIG. 1, a system for managing by extracting and combining related messages between a specific person and a user 100a according to an embodiment may include a user terminal 200a, client terminals (200b, 200c, 200d, 200e, . . . , 200n (hereinafter, referred to as 200n), and a VIP management service providing server 300. The user terminal 200a and the client terminal 200n are intended to distinguish a subject that uses the terminal, and common characteristics of the user terminal 200a and the client terminal 200n will be described in a terminal 200.

Further, each component of FIG. 1 may be connected through a network. The network means a connection structure that enables information exchange between each node such as the terminal 200 and the VIP management service provider 300, and such a network includes, for example, a 3rd Generation Partnership Project (3GPP) network, a Long Term Evolution (LTE) network, a World Interoperability for Microwave Access (WIMAX) network, Internet, a Local Area network (LAN), a Wireless Local Area network (Wireless LAN), a Wide Area network (WAN), a Personal Area network (PAN), a Bluetooth network, a satellite broadcasting network, an analog broadcasting network, and a Digital Multimedia Broadcasting (DMB) network, but the network is not limited thereto.

User Terminal

First, the user 100a means a user who uses a VIP management function through the VIP management service providing server 300.

The user 100a may transmit and receive messages to and from a plurality of clients using the user terminal 200a. That is, the user terminal 200a may provide a function of transmitting and receiving an instant message with chatting with a plurality of clients through a chat room.

Furthermore, the user terminal 200a may provide a function of transmitting and receiving a comment while performing a project or a function of transmitting and receiving a mail with one message transmission and reception function including a chat function in a chat room as well as chatting in a chat room.

The user 100a may use a VIP management service that selects at least some clients to specific persons among clients who transmitted and received messages through the user terminal 200a and that effectively combines and manages related messages between the selected specific persons and the user 100a.

Client Terminal

A user 100 means all persons who use a VIP management service, and a client is defined to the user 100 who transmits and receives a message to and from the user 100a among users 100 who use the VIP management service.

That is, hereinafter, in an embodiment of the present invention, and the user 100 who transmits and receives messages to and from the user 100a through a message transmission and reception function is defined to a client, and a specific person is defined to the user 100 set to a VIP by the user 100a among clients.

Here, the VIP is a specific object in which the user 100a particularly manages, and when the user 100a sets using the user terminal 200a, the VIP may be designated.

For example, a random user 100a may select a client 2, 100c of clients to a specific person, and the selected client 2, 100c may be classified as a specific person of the user.

Further, in an embodiment of the present invention, it is described that a subject that uses a VIP management service is limited to the user 100a, but it will be apparent by the above description that the user 100a is any one of clients and that the client may be a subject of a VIP management service.

Hereinafter, the user terminal 200a and the client terminal 200n are intended to distinguish a terminal of a person who uses a VIP management service and a terminal of a target to be managed, and common characteristics of both terminals will be first described hereinafter.

Terminal

Figure 2:
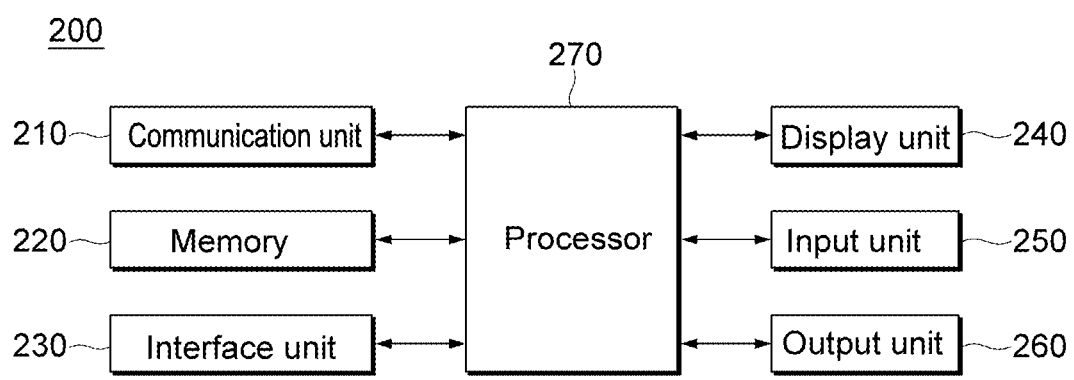
FIG. 2 is a block diagram illustrating a configuration of a terminal according to an embodiment of the present invention.

FIG. 2 is a block diagram illustrating a configuration of a terminal 200 according to an embodiment of the present invention.

Referring to FIG. 2, the terminal 200 may include a communication unit 210, a memory 220, an interface unit 230, a display unit 240, an input unit 250, an output unit 260, and a processor 270.

The terminal 200 may be connected to a VIP management service and include a portable terminal in which an application that provides a VIP management service function is installed or a fixed terminal in which a program is installed.

For example, the terminal 200 is a portable terminal and may include a smart phone, a digital broadcasting terminal, a cellular phone, personal digital assistants (PDA), a portable multimedia player (PMP), a navigation device, a tablet PC, a wearable device, and smart glass.

Further, the terminal 200 may further include a computing device that may connect to a VIP management service using wired/wireless communication, as in a personal computer such as a laptop computer and an ultrabook and a desktop PC, which is a fixed terminal.

In this case, in the terminal 200, an application (or computer program) for providing various message transmission and reception functions may be installed, and the terminal 200 may provide various message transmission and reception functions through the application, a web browser, or already installed other application programs.

Here, the message transmission and reception function may include at least one of an instant message function, an email message function, a project comment message function, an SMS message function, an SNS message function, a schedule sharing message function, and a payment request message function.

Specifically, in an embodiment, the terminal 200 may provide an instant message function of displaying instant messages transmitted and received to and from a client terminal in at least one chat room. For reference, a chat room may mean a virtual space opened on the VIP management service providing server 300 such that at least one client participates and exchange instant messages.

In order to provide such a message transmission and reception function and VIP management function, a process will be described in detail in which each unit of the terminal 200 is driven.

First, the communication unit 210 may transmit and receive data for providing a message transmission and reception function with the VIP management service providing server 300 or an external communication device through data communication and transmit and receive data for providing a VIP management function.

Such a communication unit 210 may be a communication processor for transmitting and receiving radio signals to and from at least one of a base station, an external terminal, and the VIP management service providing server 300 on a mobile communication network constructed according to technical standard or communication method for mobile communication (e.g., Global System for Mobile communication (GSM), Code Division Multi Access (CDMA), High Speed Downlink Packet Access (HSDPA), High Speed Uplink Packet Access (HSUPA), Long Term Evolution (LTE), and Long Term Evolution-Advanced (LTE-A).

Further, the communication unit 210 may be a communication processor for transmitting and receiving radio signals with a wireless communication method such as a Wireless LAN (WLAN), Wireless-Fidelity (Wi-Fi), Wireless Fidelity (Wi-Fi) Direct, Digital Living Network Alliance (DLNA), Wireless Broadband (WiBro), and World Interoperability for Microwave Access (WiMAX).

Further, the communication unit 210 may transmit and receive radio signals with a short range wireless communication method. For example, the communication unit 210 may be a communication processor that supports short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB).

The memory 220 may store at least one of an application program, data, and an instruction necessary for a functional operation according to an embodiment of the present invention.

In an embodiment, the memory 220 may store an application for providing a message transmitting and receiving service between the user 100a and a plurality of clients and store a message transmitting and receiving application program that may be used by interworking with already installed other applications.

The memory 220 may include a program area and a data area. The program area may be linked between an operating system (OS) for booting the terminal 200 and function elements, and in the data area, data occurring according to use of the terminal 200 may be stored.

The memory 220 may be various storage devices such as a ROM, a RAM, an EPROM, a flash drive, and a hard drive and may be a web storage that performs a storage function of the memory 220 in the Internet.

The interface unit 230 may be used for connecting input and output peripheral devices of the terminal 200 to a CPU and the memory 220.

The interface unit 230 may include at least one of a wired/wireless headset port, an external charger port, a wired/wireless data port, a memory card port, a port for connecting a device having an identification module, an audio Input/Output (I/O) port, a video I/O port, and an earphone port. Further, the interface unit 230 may include a short range wireless communication module such as Bluetooth or WiFi.

Next, the display unit 240 may display graphical images.

Such a display unit 240 may be configured with a display circuit that transfers a signal and a display panel that displays an image.

Specifically, the display unit 240 may display a chat room including transmitted and received messages and display at least one of a VIP setting window, a VIP list window, a VIP filter setting window, and a combined management room for providing a VIP management function with graphic images.

Such a display unit 240 may be a display directly mounted in a personal computer and may be a display device connected through the interface unit 230.

Further, the display unit 240 may include at least one of a liquid crystal display (LCD), a thin film transistor-liquid crystal display (TFT LCD), an organic light-emitting diode (OLED), a flexible display, 3-dimensional display (3D display), and an electronic ink display (e-ink display).

Next, the input unit 250 may detect the user's input 100a.

For example, the input unit 250 may detect a message content input of the user 100a, project comment message content input, a VIP setting request input, a VIP setting input, and/or a final VIP message additional management function input.

Further, the input unit 250 may include a touch sensor coupled to the display unit 240. Further, the input unit 250 may include input devices such as a mouse and a keyboard connected through the interface unit 230.

The output unit 260 may process and output various methods of signals such as various audio sounds, haptic signals, and/or indicating lamps.

In an embodiment, the audio processor may perform a function of reproducing an audio signal output from the terminal 200 or controlling an audio signal such as a voice input from a microphone (MIC).

Finally, the processor 270 may control and drive overall operations of the above-described each unit.

Specifically, in an embodiment, by controlling and driving overall operations of the each unit, the processor 270 may enable interworking between the terminal 200 and the VIP management service providing server 300 and provide a smooth VIP management service.

The processor 270 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electrical units for performing other functions.

VIP Management Service Providing Server

The VIP management service providing server 300 may transmit and receive data to and from a plurality of terminals 200 through a network and assist smooth provision of a VIP management service.

In more detail, in an embodiment, the VIP management service providing server 300 may transmit various data necessary for execution of an application installed in the terminal 200.

Further, the VIP management service providing server 300 may form and store information received from the terminal 200 in a database.

Further, the VIP management service providing server 300 may perform a function of a relay for transmitting information received from a random terminal 200 to another terminal 200.

Further, the VIP management service providing server 300 may perform a function of providing an application execution file to the terminal 200 in response to a request from the terminal 200 and perform overall management of an application executed in the terminal 200 through communication.

In an embodiment, the VIP management service providing server 300 may include at least one of a controller, a database, a message receiver, and a message transmitter.

Hereinafter, in an embodiment of the present invention, it is described that a series of processes, are performed in the terminal 200, such as setting a specific client designated by the user 100a to a VIP, extracting and combining related messages between the user 100a and the preset VIP to generate one combined management room, and outputting and managing the generated combined management room. However, in another embodiment, some of the above series of data processing processes may be performed in the terminal 200, and the remaining processes may be performed in the VIP management service providing server 300.

Method of Providing a VIP Management Service

A method of managing by extracting and combining related messages between the VIP and the user 100a will be described in detail.

Figure 3:
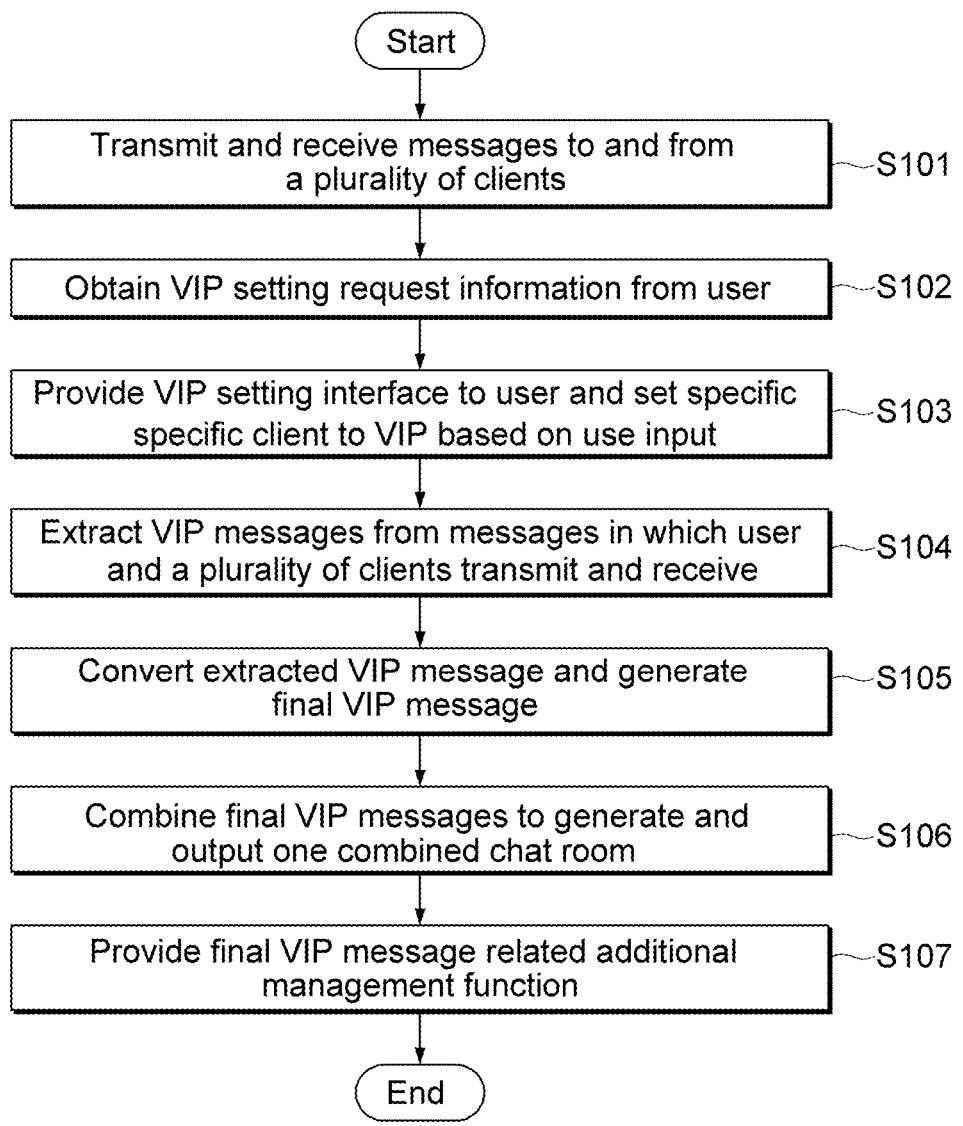
FIG. 3 is a flowchart of a terminal illustrating a method of managing by a extracting and combining related messages between a specific person and a user according to an embodiment of the present invention.

FIG. 3 is a flowchart of a terminal 200 illustrating a method of managing by a extracting and combining related messages between a specific person and a user 100a according to an embodiment of the present invention.

Referring to FIG. 3, the user terminal 200a may transmit and receive messages to and from a plurality of clients (S101).

In an embodiment, the user terminal 200a may provide an instant message function of displaying instant messages transmitted and received to and from a client terminal through at least one chat room including a client. That is, the user terminal 200a may provide a function of chatting with a plurality of clients through a chat room to transmit and receive an instant message.

Furthermore, the user terminal 200a may transmit and receive messages to and from clients through a function of transmitting and receiving comments while performing a project or transmitting and receiving an email using one message transmission and reception function including a chatting function in a chat room as well as chatting in the chat room.

That is, the message in the embodiment may include heterogeneous format messages such as project comments or emails transmitted and received to and from the client using the same message transmission and reception function as well as an instant message displayed through the chat room.

That is, applications installed in the user terminal 200a may include at least one of an instant messenger program, an email program, a project management program, an SMS program, an SNS program, a schedule management program, and a payment management program, and such message transmission and reception programs may be used with one account.

Further, the user terminal 200a may embed the above-described programs in each separated program state and may embed the above-described programs in a program state that manages by including and combining at least one of the above-described programs.

Further, in an embodiment, when driving the instant messenger program, the user terminal 200a may display a chat room including instant messages transmitted by clients on a screen with a graphic image.

Here, the chat room may include at least one of a single chat room in which the user 100a uses alone, a 1:1 chat room in which the user 100a and one random client participate and use, and a 1: many chat room in which the user 100a and at least one random client participate and use.

The user terminal 200a that provides such a message transmission and reception function may further provide a VIP management function of performing collection view at one time only related messages between a VIP to be specifically managed and the user 100a.

That is, when the user provides a VIP management function and receives an execution input of the user 100a, the user terminal 200a may execute a VIP management function (S102).

In this case, when the user 100a previously sets at least some of clients to VIPs, the user terminal 200a may provide a function of managing the preset VIPs and when there is no VIP setting or when the user requests VIP setting, the user terminal 200a may first provide a VIP setting interface.

The user terminal 200a may generate VIP setting information according to information input by the user 100a using the VIP setting interface (S103).

In this case, the user terminal 200a may provide various methods of VIP setting interfaces to the user 100a. Here, various methods of VIP setting interfaces may include 1) a method in which the user 100a selects one specific client and sets the selected client to a VIP, 2) a method in which the user 100a selects a plurality of specific clients and sets a VIP group including all of a plurality of selected specific clients, and 3) a method in which the user 100a sets a VIP group including a client corresponding to a filter selected through VIP filter setting.

Figure 4:
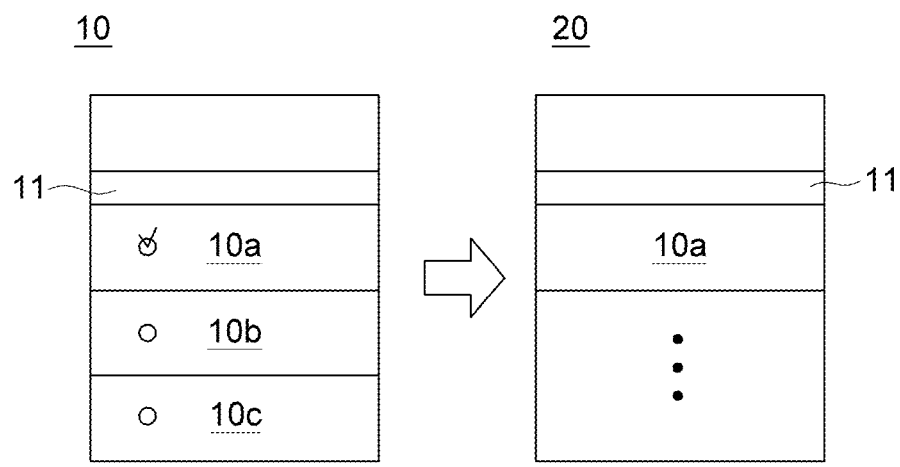
FIG. 4 is a conceptual diagram defining a VIP selection window and a VIP list window for explaining a VIP setting method according to an embodiment of the present invention.
Figure 5:
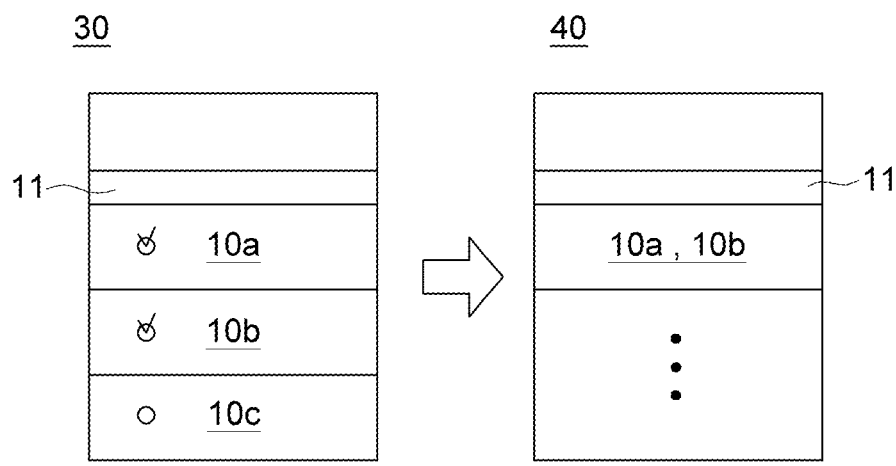
FIG. 5 is a conceptual diagram defining a VIP selection window and a VIP list window for explaining a VIP group setting method according to an embodiment of the present invention.
Figure 6:
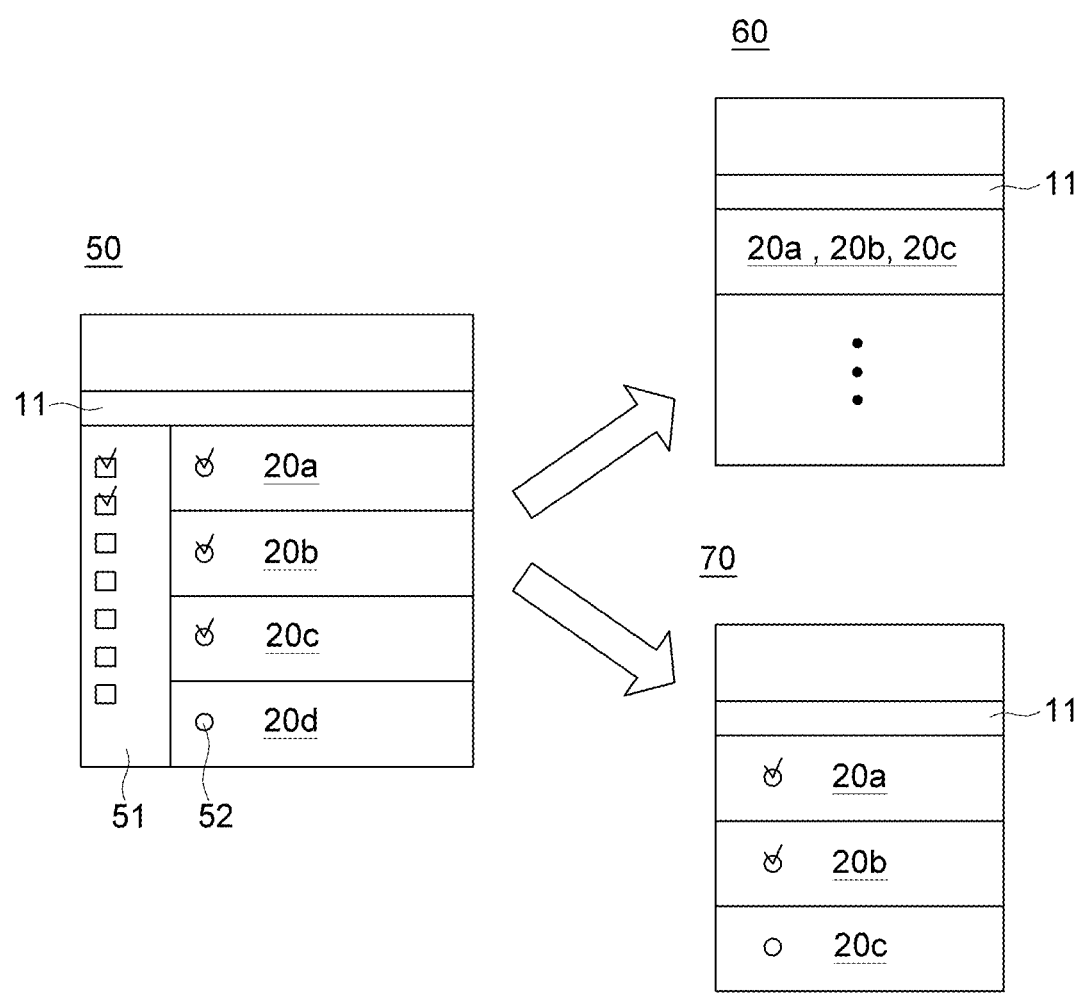
FIG. 6 is a conceptual diagram defining a VIP filter selection window and a VIP list window for explaining a VIP filter setting method according to an embodiment of the present invention.

More specifically, referring to FIGS. 4 to 6, in order to provide the VIP setting interface to the user 100a, the user terminal 200a may display a VIP selection window and/or a VIP filter selection window 50.

Here, the VIP selection window may include at least one of a VIP selection window name, a search window 11, a selection button, and other client information.

Here, in an embodiment, the search window 11 may enable to search for other client account information in which the user 100a has based on a name of other client and/or an account of other client set with a method of designation of the user 100a and/or direct designation of other client.

Further, the selection button may be given to each of other client information, and when a selection button given to another client in which the user 100a wants to set to the VIP is clicked, the VIP may be selected. In this case, the selection button may exist in a check box form in some of other client information and may be a layer representing other client information.

Further, the other client information may include at least one of a profile picture, name, and account information of other client. Further, the other client information may be displayed on at least one VIP selection window.

Thereafter, the user terminal 200a may generate VIP setting information based on information in which the user 100a inputs using the VIP selection window and set a specific client to a VIP based on the generated VIP setting information.

The user terminal 200a may combine VIP information of the preset VIP into one list to generate and output a VIP list window.

Specifically, the user terminal 200a may combine preset VIP information and currently set VIP information into one list to generate and output a VIP list window.

Here, the VIP information may include at least one of a profile picture, name, and account information of the VIP. Further, the VIP information may be displayed in at least one VIP list window.

In this case, the VIP list window may include at least one of a VIP list window name, a search window 11, and VIP information.

In an embodiment, referring to FIG. 4, the user terminal 200a may provide a method in which the user 100a selects one specific client to set the one specific client to a VIP to the user 100a, and in this case, the user terminal 200a may display a VIP selection window 1, 10 to the user 100a.

Here, the VIP selection window 1, 10 may include at least one of a layer that may include a name of the VIP selection window 1, 10, a search window 11, a selection button, and other client information.

Further, the VIP selection window 1, 10 may include at least one other client information, and in an embodiment, another client 1, 10*a*, another client 2, 10*b*, and another client 3, 10*c* may be included in the VIP selection window 1, 10.

Thereafter, the user terminal 200*a* may generate VIP setting information based on information in which the user 100*a* inputs in the VIP selection window 1, 10 and set a specific client (in an embodiment, another client 1, 10*a*) to a VIP based on the generated VIP setting information.

Further, the user terminal 200*a* may couple VIP information of the preset VIP (in the embodiment, another client 1, 10*a*) in one list to generate and output a VIP list window 1, 20.

In this case, the VIP list window 1, 20 may include at least one of a layer that may include a name of the VIP list window 1, 20, a search window 11, and VIP information, and when there is preset VIP information, the preset VIP information and currently set VIP information may be combined in one list to be generated and output in the VIP list window 1, 20.

In another embodiment, referring to FIG. 5, the user terminal 200*a* may provide a method in which the user 100*a* selects a plurality of specific clients to set a VIP group, and in this case, the user terminal 200*a* may display a VIP selection window 2, 30 to the user 100*a*.

Here, the VIP selection window 2, 30 may include at least one other client information, and in an embodiment, another client 1, 10*a*, another client 2, 10*b*, and another client 3, 10*c* may be included in the VIP selection window 10.

Further, the user terminal 200*a* may generate VIP setting information based on information in which the user 100*a* inputs to the VIP selection window 2, 30 and set a specific client (in an embodiment, another client 1, 10*a*, another client 2, 10*b*) based on the generated VIP setting information to a VIP group.

Further, the user terminal 200*a* may couple VIP information of the preset VIP (in the embodiment, another client 1, 10*a*, another client 2, 10*b*) in one list to generate and output a VIP list window 2, 40.

In this case, the VIP list window 2, 40 may couple and display VIP information of another client 1, 10*a* and another client 2, 10*b* to one layer.

In the embodiment, it has been described that the VIP selection window is configured with at least one of a VIP selection window name, a search window 11, a selection button, and other client information, but may be implemented into various configurations and UIs in a range in which a person of ordinary skill in the art may execute.

Referring to FIG. 6, the user terminal 200*a* may provide a method in which the user 100*a* sets a VIP group using VIP filter setting to the user 100*a*, and in this case, the user terminal 200*a* may display a VIP filter selection window 50.

Here, the VIP filter selection window 50 may include at least one of a VIP filter selection window 50 name, a search window 11, a selection button, and other client information.

Here, the selection button of the VIP filter selection window 50 may be given to each of other client information, may be default set to a state in which all VIP filter selection buttons are selected, and when a selection button given to other client not be included in the VIP is clicked, the selection button may be released 52. In this case, the selection button may exist in a check box form in some of other client information and may be a layer representing other client information.

Further, the selection button of the VIP filter selection window 50 may be given on a filter window.

Here, the selection button given to the filter window may be default set to a state in which all selection is released, and a selection button given to a filter reference to be selected based on filtering may be clicked and selected.

In this case, the filter window may provide a function of enabling the user 100*a* to set a VIP through filtering according to a filter reference.

In this case, the filter reference may include at least one of a rank, years of service, age, and sex, and multiple filter references may be selected.

Therefore, the user terminal 200*a* may extract only other client information appropriate to the selected filter reference from other client information in which the user 100*a* has to display the other client information in the VIP filter selection window 50.

The user terminal 200*a* may generate VIP setting information based on information in which the user 100*a* inputs to the VIP filter selection window 50 and set a specific client (in the embodiment, other clients 4, 20*a*, 5, 20*b*, and 6, 20*c*) to a VIP group based on the generated VIP setting information.

Further, the user terminal 200*a* may couple VIP information of the preset VIP (in the embodiment, other clients 4, 20*a*, 5, 20*b*, and 6, 20*c*) in one list to generate and output a VIP list window 3, 60 or a VIP list window 4, 70.

In this case, the VIP list window 3, 60 may couple and display VIP information of the other clients 4, 20*a*, 5, 20*b*, and 6, 20*c* to one layer. Further, a VIP list window 4, 70 may generate and display VIP information of the other clients 4, 20*a*, 5, 20*b*, and 6, 20*c* in each different layer.

In the above embodiment, it has been described that the VIP filter selection window 50 may be configured with at least one of a VIP filter selection window 50 name, a search window 11, a selection button, and other client information, but may be implemented in various configurations and UIs in a range in which a person of ordinary skill in the art may execute.

Thereafter, the user terminal 200*a* may extract messages received from the VIP from messages in which the user 100*a* and a plurality of clients transmit and receive to classify the extracted messages into VIP messages (S104).

Specifically, the user terminal 200*a* may extract VIP messages received from at least one chat room while executing an instant message. For example, the user terminal 200*a* may extract an instant message received from the VIP in a chat room within an instant messenger function used by the user 100*a*.

In this case, the chat room may include all chat rooms in which the user 100*a* and a VIP are together included, and related instant messages between the user 100*a* and the VIP may include instant messages transmitted by the VIP in all chat rooms in which the user 100*a* and the VIP are together included.

Further, the user terminal 200*a* may extract VIP messages, which are messages received from the VIP among messages received through various message transmission and reception functions in which the user 100*a* uses.

Further, the user terminal 200*a* may convert the extracted VIP messages to final VIP messages to be suitable to collection view in a combined chat room (S105).

In an embodiment, in order to suitable display an instant message received from the VIP in the combined chat room in at least one chat room through an instant messenger function, the user terminal 200*a* may further couple additional information such as position information of the instant message and convert the instant message to a final VIP message.

More specifically, in order to combine and output a VIP message extracted from heterogeneous format message transmission and reception functions (e.g., email, project comment, schedule management comment, and payment message) different from an instant messenger function to one message transmission and reception function (e.g., instant messenger function), the user terminal 200a may convert an attribute of the extracted VIP message.

Hereinafter, in an embodiment, it is described that the combined output message transmission and reception functions are limited to an instant messenger function, but an embodiment is available in which one of the above-described various message transmission and reception functions is combined and output. However, a chat room-based instant messenger function that lists and displays a plurality of VIP messages in a time line may be a most desirable function of enabling the user 100a to intuitively and quickly check a combined message.

In an embodiment, the user terminal 200a may convert an attribute of the extracted heterogeneous format VIP message to an instant message format that may use in a chat room of an instant messenger function.

More specifically, when the VIP message is an email, the user terminal 200a may extract a title of the email and/or a portion of an email content and convert the title of the email and/or the portion of the email content to an instant message format.

Further, in a project management function, when a comment in which the VIP is written in the project is extracted as a VIP message, the user terminal 200a may extract project proceeding step information in which the comment is written and the comment and convert the extracted project proceeding step information and comment to an instant message format. For example, the user terminal 200a may convert the VIP message to an instant message including an image that designates a project step in which the comment is written and a comment written under the image.

Further, the user terminal 200a may extract only a head line of the message from an SMS and/or SNS message format to convert the head line to an instant message format.

Further, the user terminal 200a may perform various methods of conversion processes for compatibility of images or videos.

The user terminal 200a may generate a final VIP message through attribute conversion and/or information addition of the VIP message. Here, the final VIP message may include at least one of a message content, a message reception time, a message attribute, a message position, and link information to the message position.

In this case, the attribute of the message may be a type of a message transmission and reception function of receiving a VIP message.

For example, the attribute of the message may be information representing at least one kind of an instant message, an e-mail message, a project comment message, an SMS message, an SNS message, a schedule message, and a payment request message.

Further, when the attribute of the message is an instant message, the final VIP message may further include content information before and after chatting of the corresponding message. In this case, the content information before and after chatting may include a message of the user 100a and/or other client as well as messages transmitted by the VIP. Thereby, even if the user does not move to a position of the VIP message, the user may intuitively easily understand a meaning of the VIP messages.

When special transformation is not required (e.g., when bringing the instant message format VIP message as an instant message), the user terminal 200a may add information to the extracted VIP message without an attribute conversion process to generate a final VIP message.

When generation of the final VIP message is complete, the user terminal 200a may combine the final VIP messages to generate and output one combined chat room 80 (S106).

Further, the user terminal 200a may provide a final VIP message related additional management function in the combined chat room 80 (S107).

Figure 7:
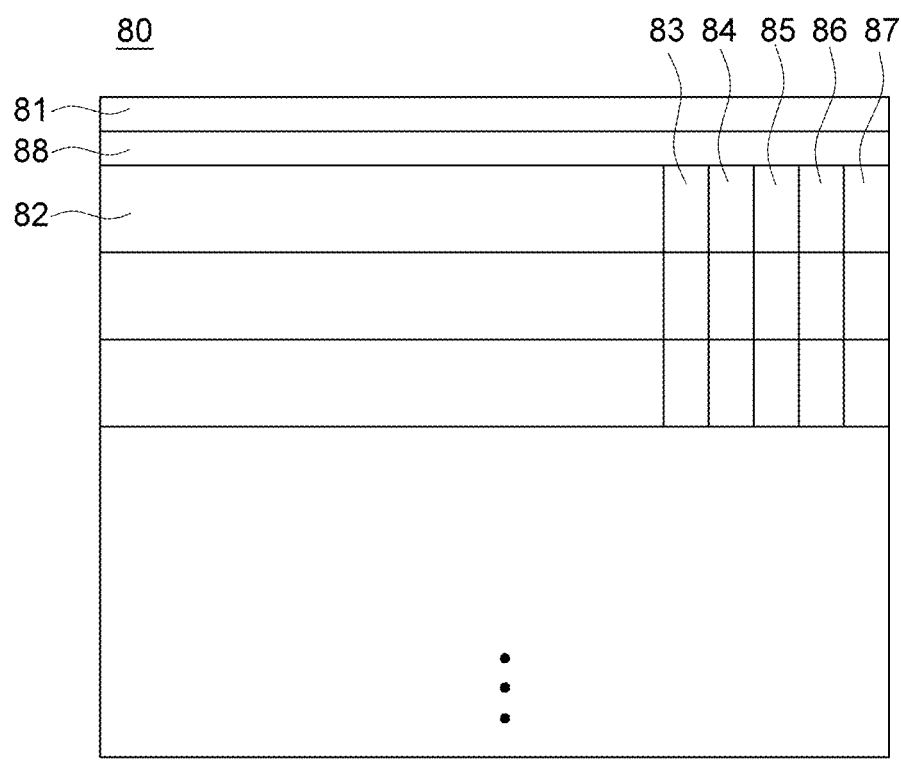
FIG. 7 is a conceptual diagram defining a combined chat room according to an embodiment of the present invention.

FIG. 7 is a conceptual diagram defining a combined chat room 80 according to an embodiment of the present invention.

Specifically, referring to FIG. 7, the user terminal 200a may generate one combined chat room 80 including the final VIP messages and display the generated combined chat room 80.

In an embodiment, the user terminal 200a may list and display final VIP messages transmitted by the VIP in a plurality of chat rooms in chronological order in one combined chat room 80. Furthermore, the user terminal 200a may list and display final VIP messages in which heterogeneous VIP messages as well as instant messages are converted in chronological order in the combined chat room 80.

That is, when the user terminal 200a includes and displays messages received from a VIP, which is a specific person designated by the user 100a in one combined chat room 80, the user 100a may quickly check messages transmitted by the VIP at one time at a recent date or a specific date without execution of several chat rooms or heterogeneous message transmission and reception functions.

In this case, the combined chat room 80 may include and display at least one of a combined chat room name 81, a message content 82 of the final VIP message, a message reception time, a message attribute, a message position, and link information to the message position.

Further, when the attribute of the final VIP message is an instant message, the combined chat room 80 may further include content information before and after chatting of the instant message. In this case, the content information before and after chatting may include a message of the user 100a and/or other client as well as a message transmitted by the VIP.

Further, the user terminal 200a may collectively display the final VIP messages in one combined chat room 80 to enable the user 100a to check the final VIP messages.

Specifically, the user terminal 200a may align and collectively display the final VIP messages based on at least one of a message reception time, a message attribute, and a message position, and a priority designated by the user 100a.

In an embodiment, the user terminal 200a may align the final VIP messages based on message reception time information of the final VIP messages to collectively display the final VIP messages from the most recently received VIP messages in the combined chat room 80.

In the above embodiment, it has been described that the user terminal 200a aligns the final VIP messages based on the message reception time information of the final VIP messages, but in another embodiment, the user terminal 200a may align final VIP messages based on a priority designated by the user 100a and align the final VIP messages based on attribute information of the message, i.e., various embodiments are available in a range in which a person of ordinary skill in the art may execute.

Further, the user terminal 200a may enable the user 100a to optionally set a background color of the combined chat room 80.

Specifically, when the user 100a wants to change a background color of a random combined chat room 80 with various reasons such as distinguishment from other chat rooms and/or the combined chat room 80 and individual tastes of the user 100a, the user terminal 200a may set a background color of the combined chat room 80 to a background color in which the user 100a wants.

Further, the user terminal 200a may provide an additional management function based on the above-described information.

Specifically, when the user 100a wants to use an additional management function for driving an additional operation using information about at least one of a message content 82, a message reception time, a message attribute, a message position, link information to the message position, and content information before and after chatting of the final VIP message, the user terminal 200a may include and provide an additional management function button that may use the additional management function in a combined management room.

In this case, the additional management function button may be given to a random position of a layer that displays each of the final VIP messages in the combined chat room 80 and may include at least one of a message receiving time button 83, a message attribute button 84, a message position, a link button 85 to the message position, and a content button before and after chatting 86.

Further, the additional management function button may generate each function request signal based on an input gesture of the user 100a to provide a trigger signal that enables the user terminal 200a to drive the additional management function.

In an embodiment, when the user 100a selects a content button before and after chatting 86, the additional management function button may generate a content request signal before and after chatting based on an input of the user 100a.

Further, the user terminal 200a may provide a memo function that may enable the user 100a to write a memo for a random final VIP message in the combined chat room 80. In this case, the additional management function button may further include a memo button 87 that may provide a memory function.

In an embodiment, after the combined chat room 80 is generated, the user terminal 200a may detect a content information request signal before and after chatting of a random final VIP message of the user 100a.

When the final VIP message includes content information before and after chatting, the user terminal 200a may add and output the content information before and after chatting to the combined chat room 80.

In this case, when outputting content information before and after chatting, the user terminal 200a may include various embodiments such as addition and output of content information before and after chatting in a layer that displays the final VIP message and generation and output of a new pop-up window.

For example, when the user terminal 200a adds and outputs the content information before and after chatting to a layer for displaying the final VIP message, the user terminal 200a may include and output the content information before and after chatting as well as the final VIP message in the message content 82 of the final VIP message.

In another embodiment of the additional management function, after the combined chat room 80 is generated, the user terminal 200a may detect a position of a random final VIP message of the user 100a and a link request signal to the position.

The user terminal 200a may provide a function of moving to a position of the VIP message to be the basis of the random final VIP message based on a message position included in the random final VIP message and link information to the position.

Specifically, when a position of the VIP message to be the basis of the random final VIP message is another chat room of an instant message function, the user terminal 200a may change an output content from a screen output of the combined chat room 80 including the random final VIP message to a screen output of the other chat room.

Here, in an additional management function of the final VIP message, in order to provide a function of moving to a position of a VIP message to be the basis of a random final VIP message, the user terminal 200a may use various programming technology and link technology on a hypertext in which a person of ordinary skill in the art may execute.

Further, in the above embodiment, it has been described that the user terminal 200a moves to another chat room of an instant message function, but various embodiments are available in a range that may be executed by a person of ordinary skill in the art, such as an e-mail message function, a project management function, an SMS function, an SNS function, a schedule management function, and a payment management function.

Further, in another embodiment of the additional management function, after the combined chat room 80 is generated, the user terminal 200a may detect a memory request signal of a random final VIP message of the user 100a.

The user terminal 200a may insert a memo of the user 100a to any one end of upper and lower and left and right ends of the random final VIP message.

The user terminal 200a may further include a search function in the combined chat room 80.

Specifically, the user terminal 200a may enable the user 100a to extract and check only a specific final VIP message through a combined search window 88 for a search function in the combined chat room 80.

For example, the user terminal 200a may search for only a random VIP to extract and check only final VIP messages related to the random VIP in a combined chat room 80 including a VIP group.

In another embodiment, the user terminal 200a may search for a specific message attribute in the combined chat room 80 to extract and check only final VIP messages related to the specific message attribute and search for a specific message reception time in the combined chat room 80 to extract and check only final VIP messages related to the specific message reception time.

Further, when the user 100a sets a VIP, the user terminal 200a may highlight related VIP messages between the VIP and the user 100a.

Specifically, in order to improve readability of the VIP messages, the user terminal 200a may highlight the VIP message using at least one of size change, thickness change, underline addition, and background color display of a VIP message text.

Figure 8:
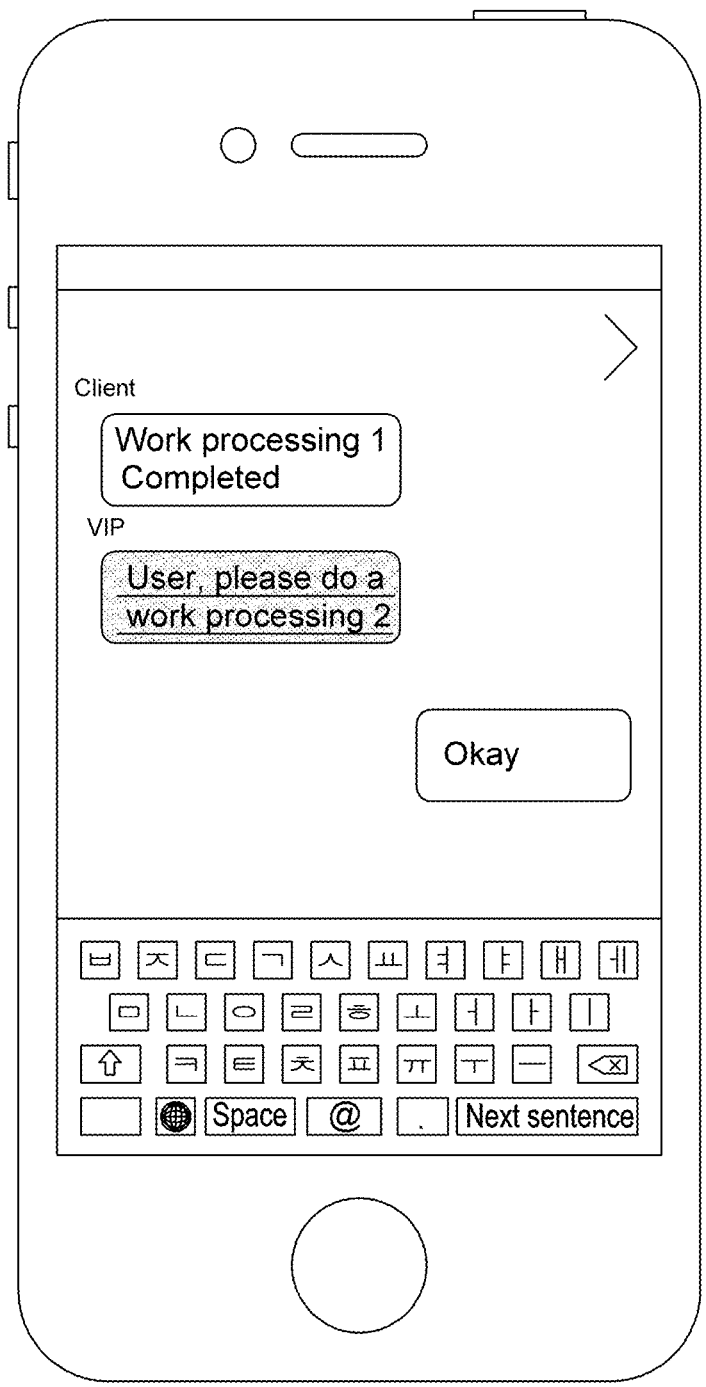
FIG. 8 is a diagram illustrating an implementation example of VIP message highlighting according to an embodiment of the present invention.

In an embodiment, referring to FIG. 8, the user terminal 200a may display an instant message text, in a bold type, in which a VIP set by the user 100a in a chat room of an instant message function transmits, add an underline to the instant message text, and designate a background color of the instant message text to highlight the instant message.

Further, when receiving a message from a VIP set by the user 100*a*, the user terminal 200*a* may set differential ring tones for each VIP.

Further, the user terminal 200*a* may set differential ring tones according to a message transmission and reception functions of a message received from the VIP.

For example, the user terminal 200*a* may set different ring tones for distinguishing a case of receiving a VIP message in an instant message function and a case of receiving a VIP message in an email message function.

Further, the user terminal 200*a* may provide a function of collectively deleting all final VIP messages of the generated combined chat room 80.

Figure 9:
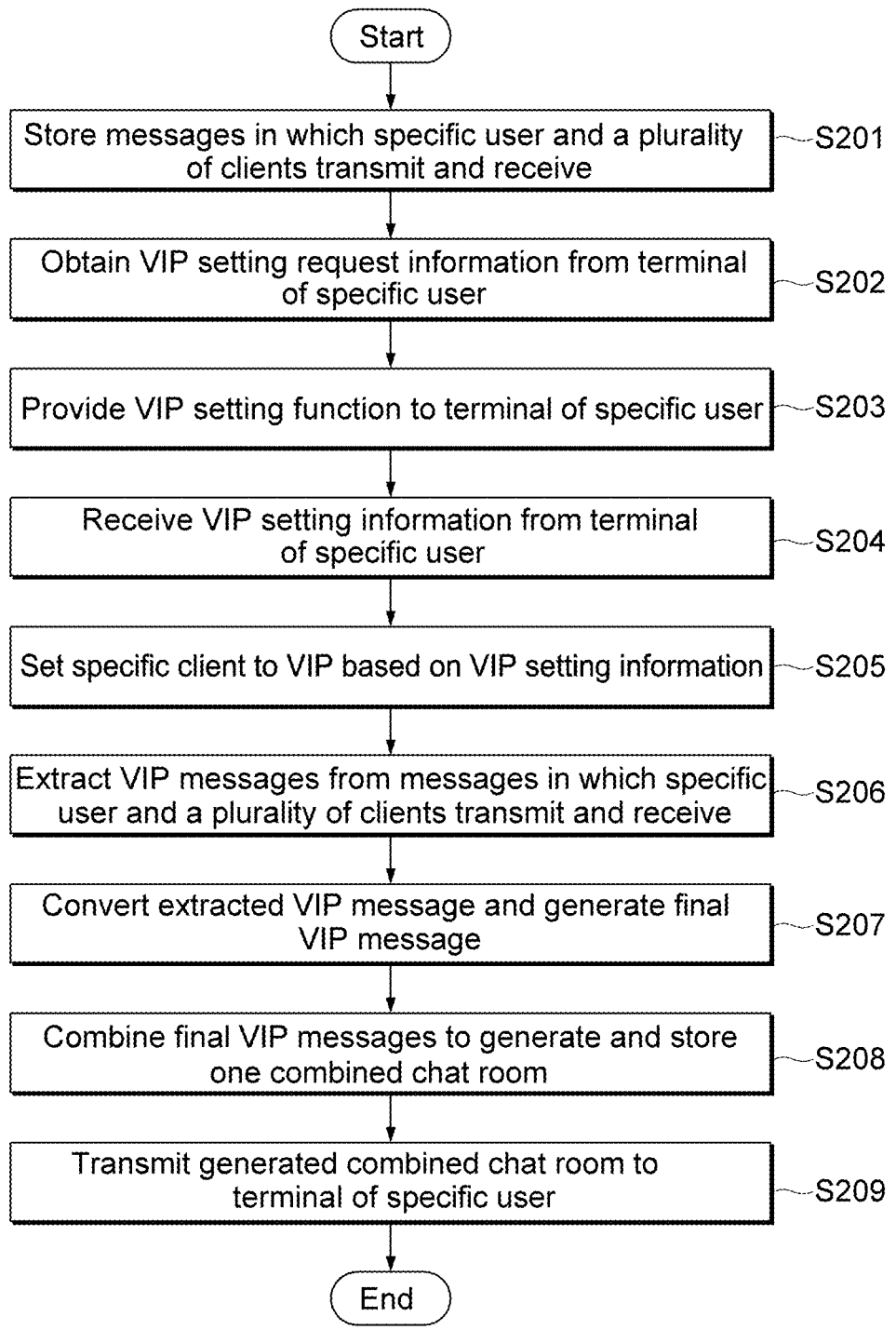
FIG. 9 is a flowchart of a server illustrating a method of managing by extracting and combining related messages between a specific person and a user according to an embodiment of the present invention.

In some embodiment of the present invention, it has been described that the terminal 200 performs a series of processes of setting a specific client designated by the user 100*a* to a VIP and extracting and combining related messages between the user 100*a* and the preset VIP to generate one combined management room and outputting and managing the generated combined management room, but in another embodiment, as shown in FIG. 9, the VIP management service providing server 300 interworking with the terminal 200 may become a subject of processing the above series of processes to provide a VIP management function through the terminal 200.

Specifically, the VIP management service providing server 300 may store messages in which the specific user 100*a* and a plurality of clients transmit and receive (S201).

Further, the VIP management service providing server 300 may obtain VIP setting request information from the user terminal 200*a* of the specific user 100*a* (S202).

Thereafter, the VIP management service providing server 300 may provide a VIP setting function to the user terminal 200*a* (S203).

Further, the VIP management service providing server 300 may receive VIP setting information from the user terminal 200*a* (S204).

The VIP management service providing server 300, having received the VIP setting information may set a specific client to a VIP based on the VIP setting information (S205).

The VIP management service providing server 300 may extract VIP messages from messages in which the specific user 100*a* and a plurality of clients transmit and receive (S206).

Thereafter, the VIP management service providing server 300, having extracted the VIP messages may convert the extracted VIP messages to generate final VIP messages (S207).

Further, the VIP management service providing server 300 may combine the final VIP messages to generate and store one combined chat room (S208).

The VIP management service providing server 300 may transmit the generated combined chat room to the user terminal 200*a* of the specific user 100*a* (209).

In this way, the present invention couples and provides related messages between users 100*a* and a VIP existing on various message transmission and reception functions to one message transmission and reception function, thereby effectively managing messages and VIP important to the user 100*a*.

The above-described embodiments of according to the present invention may be implemented in the form of a program instruction that may be executed through various computer components to be written in a computer readable recording medium. The computer readable medium may include a program instruction, a data file, and a data structure in single or in combination. The program instruction recorded at the computer readable medium may be specially designed and configured for the present invention or may be known to and used by a person of ordinary skill in the computer software art. The computer readable recording medium may include, for example, a magnetic medium such as a hard disk, a floppy disk, and a magnetic tape, an optical recording medium such as a Compact Disk Read-Only Memory (CD-ROM) or a Digital Versatile Disk (DVD), a magnetic-optical medium such as a floptical disk, and a hardware device, specially configured to store and perform a program instruction, such as a ROM, a Random-Access Memory (RAM), and a flash memory 220. The program instruction may include, for example, a high-level language code that may be executed by a computer using an interpreter as well as a machine language code formed by a compiler. The hardware device may be changed to at least one software module in order to perform a processing according to the present invention, and vice versa.

The specific executions described in the present invention are an embodiment and are not intended to limit the scope of the present invention with any method. For brevity of description, conventional electronic configurations, control systems, software, and other functional description of the systems may be omitted. Further, the connection members or the connection of lines between the elements shown in the drawing illustrate the functional connections and/or physical or circuit connections, may be replaced in the actual device, and may be represented with additional various functional connections, physical connections, or circuit connections. Further, a component without a specific description such as "essential" and "important" may be not always a component necessary for application of the present invention.

While a detailed description of the present invention has been described with reference to exemplary embodiments of the present invention, it will be understood by those skilled in the art that various changes in form and details may be made therein without departing from the spirit and scope of the invention as defined by the appended claims. Accordingly, the technical scope of the present invention should not be limited to the contents described in the detailed description of the specification but should be defined by the claims.

A method of providing a function of managing messages of a VIP according to embodiments of the present invention has an advantage that can collectively check and manage messages of a specific person designated by a user.

Further, in a method of providing a function of managing messages of a VIP according to embodiments of the present invention, by converting and providing messages of different attributes using various message transmission and reception functions to messages of an attribute appropriate to a single message transmission and reception function, compatibility between various message transmission and reception functions can be maintained and readability of the message can be improved.

Further, in a method of providing a function of managing messages of a VIP according to embodiments of the present invention, by providing several additional functions of enabling to effectively manage and use one combined message, a specific person can be managed more efficiently.

What is claimed is:

1. A method of handling messages of a user using a messaging application of a user device, the method comprising:
   providing the messaging application for consolidating messages of a plurality of communication mechanisms, wherein the plurality of communication mechanisms comprising at least one email service and at least one instant messaging (IM) service, wherein the messaging application presents the user's email messages and IM messages together in one scrollable user interface;

receiving, on the messaging application, a setting of the user for identifying at least one email address of a person and at least one IM service identification of the person;

communicating, by the messaging application, with one or more servers of the at least one email service to retrieve email messages that the user has had with the person via the at least one email service;

communicating, by the messaging application, with one or more servers of the at least one IM service to retrieve IM messages that the user has had with the person via the at least one IM service; and displaying, on the scrollable user interface, a plurality of messages comprising the retrieved email messages and the retrieved IM messages such that the retrieved email and IM messages are navigable on the scrollable user interface, wherein displaying the plurality of messages comprises presenting, on the scrollable user interface in a chronological order, a first group of messages comprising email messages and IM messages that occurred in a first time window among the retrieved email messages and the retrieved IM messages, wherein displaying the plurality of messages further comprises presenting a link after a first email message of the first group of messages and between the first email message and another message of the first group of messages; and in response to selection of the link, activating an email application of the user device to present a second email message that immediately preceded the first email message but occurred outside the first time window, wherein the email application displays a screen listing the second email message together with the first email message.

2. The method of claim 1, wherein the first group of messages are presented in the form of message balloons comprising a first message balloon corresponding to the first email message,
    wherein in response to selection of the link, the messaging application displays a second message balloon corresponding to the second email message.

3. The method of claim 2, further comprising:
in response to selection of the first message balloon, activating an email client application on the user device to display a screen presenting the first email message.

4. The method of claim 2, further comprising:
displaying a scroll bar interface at a first position corresponding to the first time window; and
in response to selection of the link, moving the scroll bar interface to a second position corresponding to a second time window when the second email message was communicated.

5. The method of claim 1,
wherein the first group of messages are presented in the form of message balloons comprising a first message balloon corresponding to the first email message,
wherein the second email message has same recipients as the first email message; and
wherein in response to selection of the link, the messaging application displays a second message balloon corresponding to the second email message.

6. The method of claim 1,
wherein the first group of messages are presented in the form of message balloons comprising a first message balloon corresponding to the first email message,
wherein the second email message has a common attachment with the first email message; and
wherein in response to selection of the link, the messaging application displays a second message balloon corresponding to the second email message.

7. The method of claim 1,
wherein the second email message has same recipients as the first email message, or includes a common attachment with the first email message.

* * * * *